United States Patent
Krivopaltsev et al.

(10) Patent No.: US 10,802,660 B1
(45) Date of Patent: Oct. 13, 2020

(54) METADATA-DRIVEN BINDING OF PLATFORM-AGNOSTIC CONTENT TO PLATFORM-SPECIFIC USER-INTERFACE ELEMENTS

(71) Applicant: INTUIT INC., Mountain View, CA (US)

(72) Inventors: Eugene Krivopaltsev, San Jose, CA (US); Marc J. Attinasi, Ramona, CA (US); Shailesh K. Soliwal, Redwood City, CA (US)

(73) Assignee: INTUIT INC., Mountain View, CA (US)

( * ) Notice: Subject to any disclaimer, the term of this patent is extended or adjusted under 35 U.S.C. 154(b) by 805 days.

(21) Appl. No.: 14/813,013

(22) Filed: Jul. 29, 2015

(51) Int. Cl.
*G06F 3/0481* (2013.01)
*G06F 3/0484* (2013.01)

(52) U.S. Cl.
CPC .......... *G06F 3/0481* (2013.01); *G06F 3/0484* (2013.01)

(58) Field of Classification Search
CPC .............................. G06F 3/0481; G06F 3/0484
See application file for complete search history.

(56) References Cited

U.S. PATENT DOCUMENTS

| | | |
|---|---|---|
| 6,694,482 B1 | 2/2004 | Arellano et al. |
| 6,754,668 B2 | 6/2004 | Noble et al. |
| 6,782,370 B1 | 8/2004 | Stack |
| 7,133,895 B1 | 11/2006 | Lee et al. |
| 7,149,776 B1 | 12/2006 | Roy et al. |
| 7,194,473 B1 | 3/2007 | Hichwa et al. |

(Continued)

FOREIGN PATENT DOCUMENTS

| | | | |
|---|---|---|---|
| JP | 2009217676 A | 9/2009 | |
| KR | 1020090042018 A | 4/2009 | |
| WO | WO-2013085427 A1 * | 6/2013 | ........... G06F 3/1454 |

OTHER PUBLICATIONS

Gitana Software Inc., "Alpaca—HTML5 Forms for JQuery—Form Buttons", Jun. 5, 2014, Retrieved from the Internet on Jul. 2, 2018: URL: https://web.archive.org/web/20140605100521/http://alpacajs.org:80/examples/components/form-controls/buttons.html (3 pages).

(Continued)

*Primary Examiner* — Ryan Barrett
*Assistant Examiner* — Parmanand D Patel
(74) *Attorney, Agent, or Firm* — Patterson + Sheridan, LLP

(57) ABSTRACT

The disclosed embodiments provide a system that facilitates use of an application on an electronic device. During operation, the system obtains a first metadata definition containing a mapping of view components in a user interface of the application to a set of attribute-specific types associated with an attribute of the electronic device, and a second metadata definition containing a set of rules for binding the attribute-specific types to a set of platform-specific user-interface elements for a platform of the electronic device. Next, the system generates a view for display in the user interface by applying, based on the attribute and the platform, the first and second metadata definitions to content describing the view to select one or more platform-specific user-interface elements for rendering one or more of the view components in the content. The system then instantiates the platform-specific user-interface element(s) to render the view component(s).

17 Claims, 5 Drawing Sheets

(56) References Cited

U.S. PATENT DOCUMENTS

| | | | |
|---|---|---|---|
| 7,712,023 B1 | 5/2010 | Bryan | |
| 7,726,561 B2 | 6/2010 | Katyal et al. | |
| 7,814,107 B1 | 10/2010 | Thirumalai et al. | |
| 7,865,412 B1 | 1/2011 | Weiss et al. | |
| 8,356,276 B2 | 1/2013 | Bender | |
| 8,909,548 B1 | 12/2014 | Ran et al. | |
| 8,924,269 B2 | 12/2014 | Seubert et al. | |
| 8,930,253 B1 | 1/2015 | Ball | |
| 8,996,407 B2 | 3/2015 | Weiss et al. | |
| 9,286,332 B1 | 3/2016 | Roumeliotis et al. | |
| 9,400,660 B1 | 7/2016 | Krivopaltsev et al. | |
| 2001/0011250 A1 | 8/2001 | Paltenghe et al. | |
| 2002/0165880 A1 | 11/2002 | Hornsby et al. | |
| 2004/0104929 A1 | 6/2004 | Chen et al. | |
| 2004/0135807 A1 | 7/2004 | Pickering et al. | |
| 2004/0143502 A1 | 7/2004 | McClung | |
| 2004/0189670 A1* | 9/2004 | Govindan | G06F 9/451 345/619 |
| 2005/0060647 A1 | 3/2005 | Doan et al. | |
| 2005/0114361 A1 | 5/2005 | Roberts et al. | |
| 2005/0193368 A1* | 9/2005 | Becker | G06F 9/451 717/106 |
| 2006/0041546 A1 | 2/2006 | Ahn | |
| 2006/0174217 A1* | 8/2006 | Yan | G06F 8/38 715/866 |
| 2006/0200749 A1* | 9/2006 | Shenfield | G06F 8/38 715/239 |
| 2006/0242124 A1 | 10/2006 | Fields et al. | |
| 2006/0242566 A1 | 10/2006 | Dunietz et al. | |
| 2007/0050778 A1 | 3/2007 | Lee et al. | |
| 2007/0073683 A1 | 3/2007 | Kobayashi et al. | |
| 2007/0078925 A1 | 4/2007 | Neil et al. | |
| 2007/0162274 A1 | 7/2007 | Ruiz et al. | |
| 2007/0238475 A1 | 10/2007 | Goedken | |
| 2008/0065569 A1 | 3/2008 | Dutt et al. | |
| 2008/0071657 A1* | 3/2008 | Matic | G06F 8/38 705/35 |
| 2008/0091784 A1* | 4/2008 | Sundstrom | G06F 17/2217 709/206 |
| 2010/0199198 A1* | 8/2010 | Relyea | G06F 8/38 715/762 |
| 2011/0023016 A1 | 1/2011 | Khader et al. | |
| 2011/0093514 A1 | 4/2011 | Brown et al. | |
| 2011/0154305 A1 | 6/2011 | LeRoux et al. | |
| 2011/0282714 A1 | 11/2011 | Cullen, III et al. | |
| 2012/0084185 A1 | 4/2012 | Ciaramitaro et al. | |
| 2012/0226708 A1 | 9/2012 | Srinivasa et al. | |
| 2012/0240066 A1* | 9/2012 | Bovett | G06F 9/451 715/762 |
| 2012/0323889 A1 | 12/2012 | Marum et al. | |
| 2013/0024766 A1 | 1/2013 | Gupta et al. | |
| 2013/0117351 A1 | 5/2013 | Zoheir et al. | |
| 2013/0159228 A1 | 6/2013 | Meijer et al. | |
| 2013/0219024 A1 | 8/2013 | Flack | |
| 2013/0283305 A1 | 10/2013 | Hirsch et al. | |
| 2013/0326430 A1 | 12/2013 | Devi et al. | |
| 2014/0052840 A1 | 2/2014 | Shukla | |
| 2014/0101539 A1 | 4/2014 | Ma et al. | |
| 2014/0125672 A1 | 5/2014 | Wintemitz et al. | |
| 2014/0129397 A1 | 5/2014 | Lazerson | |
| 2014/0136954 A1 | 5/2014 | Ligman et al. | |
| 2014/0136955 A1 | 5/2014 | Lee et al. | |
| 2014/0201616 A1 | 7/2014 | Turner et al. | |
| 2014/0229814 A1 | 8/2014 | Wright et al. | |
| 2014/0245122 A1 | 8/2014 | Oro et al. | |
| 2014/0280515 A1 | 9/2014 | Wei et al. | |
| 2014/0337414 A1 | 11/2014 | Sojoodi et al. | |
| 2015/0074518 A1 | 3/2015 | Rumsey et al. | |
| 2015/0095767 A1 | 4/2015 | Ebner et al. | |
| 2015/0310052 A1 | 10/2015 | Konik et al. | |
| 2016/0027107 A1 | 1/2016 | McDonald et al. | |
| 2016/0036935 A1 | 2/2016 | Jaskiewicz et al. | |
| 2016/0055126 A1 | 2/2016 | Doerr et al. | |
| 2016/0078567 A1 | 3/2016 | Goldman et al. | |
| 2016/0092994 A1 | 3/2016 | Roebuck et al. | |
| 2016/0094612 A1 | 3/2016 | Lockhart et al. | |
| 2016/0098250 A1* | 4/2016 | Gross | G06F 8/34 717/109 |
| 2016/0104513 A1 | 4/2016 | Bloch et al. | |

OTHER PUBLICATIONS

Gitana Software Inc., "Alpaca—Easy Forms for JQuery—Tools & Addons", Jun. 25, 2014, Retrieved from the Internet on Jul. 2, 2018: URL:https://web.archive.org/web/20140625105117/http://alpacajs.org/web/resources.html (1 page).

Anonymous: "Gitana/alpaca_ GitHub Readme.md", Oct. 16, 2013, Retrieved from the Internet on Jul. 2, 2018: URL: https://web.archive.org/web/20131016124514/https://github .com/gitana/alpaca (4 pages).

Anonymous: "jQuery Mobile—Wikipedia", Aug. 6, 2014, Retrieved from the Internet on Jul. 2, 2018: URL:https://en.wikipedia.org/w/index.php?tille=jQuery_Mobile&oldid=620090108 (11 pages).

International Search Report and Written Opinion issued in corresponding PCT/US2014/072553 dated Jun. 30, 2015 (8 pages).

International Search Report and Written Opinion issued in corresponding application No. PCT/US2014/072559 dated Jul. 28, 2015 (8 pages).

International Search Report and Written Opinion issued in corresponding application No. PCT/US2014/072535 dated Jul. 29, 2015 (11 pages).

International Search Report and Written Opinion issued in corresponding application No. PCT/US2014/072543 dated Jul. 29, 2015 (11 pages).

International Search Report and Written Opinion issued in the corresponding International Application No. PCT/US2014/053168, dated Apr. 30, 2015 (11 pages).

Extended European Search Report in related European Patent Application No. 14879253.4 dated Apr. 23, 2018 (11 pages).

Office Action in related Canadian Application No. 2,966,388 dated Jun. 1, 2017 (6 pages).

Anonymous: "Content of Save.php", Oct. 16, 2013.<URL:https://web.archive.org/web/20131016124514/https://> github.com/gitana/alpaca/archive/master.zip (1 page).

* cited by examiner

US 10,802,660 B1

METADATA-DRIVEN BINDING OF PLATFORM-AGNOSTIC CONTENT TO PLATFORM-SPECIFIC USER-INTERFACE ELEMENTS

RELATED APPLICATIONS

The subject matter of this application is related to the subject matter in a co-pending non-provisional application by inventors Jay JieBing Yu, Matthew Sivertson, Vinay Kumar, Bojan Beran, Alex Balazs and Luise Felipe Cabrera, entitled "Common Declaration Representation of Application Content and User Interaction Content Processed by a User Experience Player," having Ser. No. 14/463,415 and filing date 19 Aug. 2014.

The subject matter of this application is also related to the subject matter in a co-pending non-provisional application by inventors Eugene Krivopaltsev, Marc Attinasi and Shailesh Soliwal and filed on the same day as the instant application, entitled "Context-Aware Component Styling in User Interfaces of Electronic Devices," having serial number TO BE ASSIGNED and filing date TO BE ASSIGNED.

BACKGROUND

Related Art

The disclosed embodiments relate to user interfaces on electronic devices. More specifically, the disclosed embodiments relate to techniques for performing metadata-driven binding of platform-agnostic content to platform-specific user-interface elements on electronic devices.

A user typically interacts with an electronic device, such as a personal computer, laptop computer, tablet computer, mobile phone, digital media receiver, and/or portable media player, by providing input to and receiving output from the electronic device through various input and output mechanisms. For example, the user may enter input into a laptop computer using a keyboard, mouse, and/or touchpad and receive output from the laptop computer via a display screen and/or speakers.

Applications on the electronic device may provide user interfaces (UIs) that facilitate interaction between the user and the electronic device. In addition, the UIs may be tailored to the input/output (I/O) devices and/or form factor of the electronic device. For example, a graphical user interface (GUI) of an application on a tablet computer may provide UI components such as windows, menus, icons, checkboxes, text boxes, and/or radio buttons. These UI components may be displayed to the user through a touchscreen of the tablet computer. In turn, the touchscreen may allow the user to manipulate the UI components using gestures such as swiping, zooming, and/or tapping. Because the tablet computer may lack a physical keyboard, the touchscreen may also provide a virtual keyboard that allows the user to enter alphanumeric input into the tablet computer.

Usability is an important consideration in designing user interfaces. In particular, usability considerations may include: the efficiency with which tasks are accomplished through the UI; the user's ability to learn and master the operation of the UI; and/or the availability of feedback, help, documentation, and/or status information within the UI. For example, the user may accomplish tasks more easily and quickly if UI elements are arranged and displayed in a meaningful way within the UI. Consequently, user satisfaction with an application on an electronic device may be highly influenced by characteristics of the user interface provided by the application and/or the user's ability to interact with the user interface through I/O devices of the electronic device.

SUMMARY

As variations in the form factors, platforms, and technologies of electronic devices continue to increase, applications may be required to adapt to the variations. For example, different versions of an application may be released to support execution on different processors, input/output (I/O) devices, operating systems, form factors, and/or screen sizes.

When an application is updated to support new features, functionality, platforms, form factors, or technologies, portions of the application's user interface may be provided by platform-specific rendering components. For example, the application may include a web view rendering component that embeds web pages within screens of the user interface, as well as one or more native rendering components that use various technologies (e.g., programming languages, libraries, hardware components, etc.) to natively render user-interface components in the user interface.

To reduce overhead associated with updating the user interface of the application, content used to render the interface may be decoupled from the platform-specific rendering components used to perform the rendering. For example, an abstract view that describes the structure of the user interface may be described using structured data such as a JavaScript Object Notation (JSON) object. In turn, the structured data may be used by rendering components implemented on different platforms to render the same content in different views.

Views in the user interface may further be rendered using metadata definitions that specify bindings of platform-agnostic view components to platform-specific user-interface elements in the rendering components. For example, the metadata definitions may include mappings of the view components to intermediate, logical attribute-specific types that are based on form factor, as well as bindings of the attribute-specific types to the platform-specific user-interface elements. To render user-interface elements within a view of the user interface, a rendering component in an electronic device may first identify one or more view components in the view from content describing the view. Next, the rendering component may use a first metadata definition to map the view component(s) to the logical attribute-specific types based on the form factor of the electronic device and a second metadata definition to bind the attribute-specific types to classes that implement one or more platform-specific user-interface elements in a native rendering component. The rendering component may then render the view components by instantiating the platform-specific user-interface element(s). Consequently, rendering of the views in the application may be customized and/or modified by platform, form factor, and/or other attributes without modifying source code for the rendering components.

The disclosed embodiments provide a system that facilitates use of an application on an electronic device. During operation, the system obtains a first metadata definition containing a mapping of view components in a user interface of the application to a set of attribute-specific types associated with an attribute of the electronic device, and a second metadata definition containing a set of rules for binding the attribute-specific types to a set of platform-specific user-interface elements for a platform of the electronic device.

Next, the system generates a view for display in the user interface by applying, based on the attribute and the platform, the first and second metadata definitions to content describing the view to select one or more platform-specific user-interface elements for rendering one or more of the view components in the content. The system then instantiates the platform-specific user-interface element(s) to render the view component(s).

In some embodiments, applying the mapping and the set of rules to the content to select the one or more platform-specific user-interface components for rendering the one or more of the view components includes, for each view component in the one or more of the view components:

(i) using the first metadata definition and the attribute to obtain an attribute-specific type for the view component;

(ii) identifying a rule from the second metadata definition for binding the attribute-specific type to a platform-specific user-interface element; and (iii) obtaining the platform-specific user-interface element for rendering the view component from the rule.

In some embodiments, applying the set of rules to the content to select the one or more platform-specific user-interface components for rendering the one or more of the view components further includes obtaining an alternative platform-specific user-interface element for rendering the view component from a generic rule in the second metadata definition when the platform-specific user-interface element is not available on the electronic device.

In some embodiments, the generic rule lacks a modifier for the attribute-specific type that is included in the rule. For example, the second metadata definition may include two mappings for a view component with a type of "multiSelect." The first mapping may specify an attribute-specific type of "tabular_multi_choice_phone" for the view component, and the second mapping may specify an attribute-specific type of "toggle_months_choice_phone" for the view component. The second mapping may additionally include a "role" of "monthselector" for the "multiSelect" view component. The "role" may act as a modifier that causes the second mapping to be applied to an instance of the "multiSelect" view component when the content contains a "role" of "monthselector" for the instance. On the other hand, the first mapping may be applicable to the instance if the content does not specify a "role" for the instance. The first mapping may also be used as a generic fallback rule for when the second mapping and second metadata definition do not resolve into a user-interface element that is available on the platform of the electronic device.

In some embodiments, instantiating the one or more platform-specific user-interface elements for use in rendering the one or more view components includes obtaining one or more configuration options for a platform-specific user-interface element from the set of rules, and instantiating the platform-specific user-interface element with the one or more configuration options.

In some embodiments, the one or more configuration options include a display option. For example, the display option may include checking or unchecking of boxes, display of images with the platform-specific user-interface element, color, bordering, font, etc.

In some embodiments, the one or more configuration options include a layout option.

In some embodiments, the one or more configuration options include a size option.

In some embodiments, the attribute includes a form factor.

In some embodiments, the attribute includes an orientation.

In some embodiments, the one or more platform-specific user-interface elements are provided by a rendering component for rendering the view or the application.

BRIEF DESCRIPTION OF THE FIGURES

In the figures, like reference numerals refer to the same figure elements.

DETAILED DESCRIPTION

Figure 1:
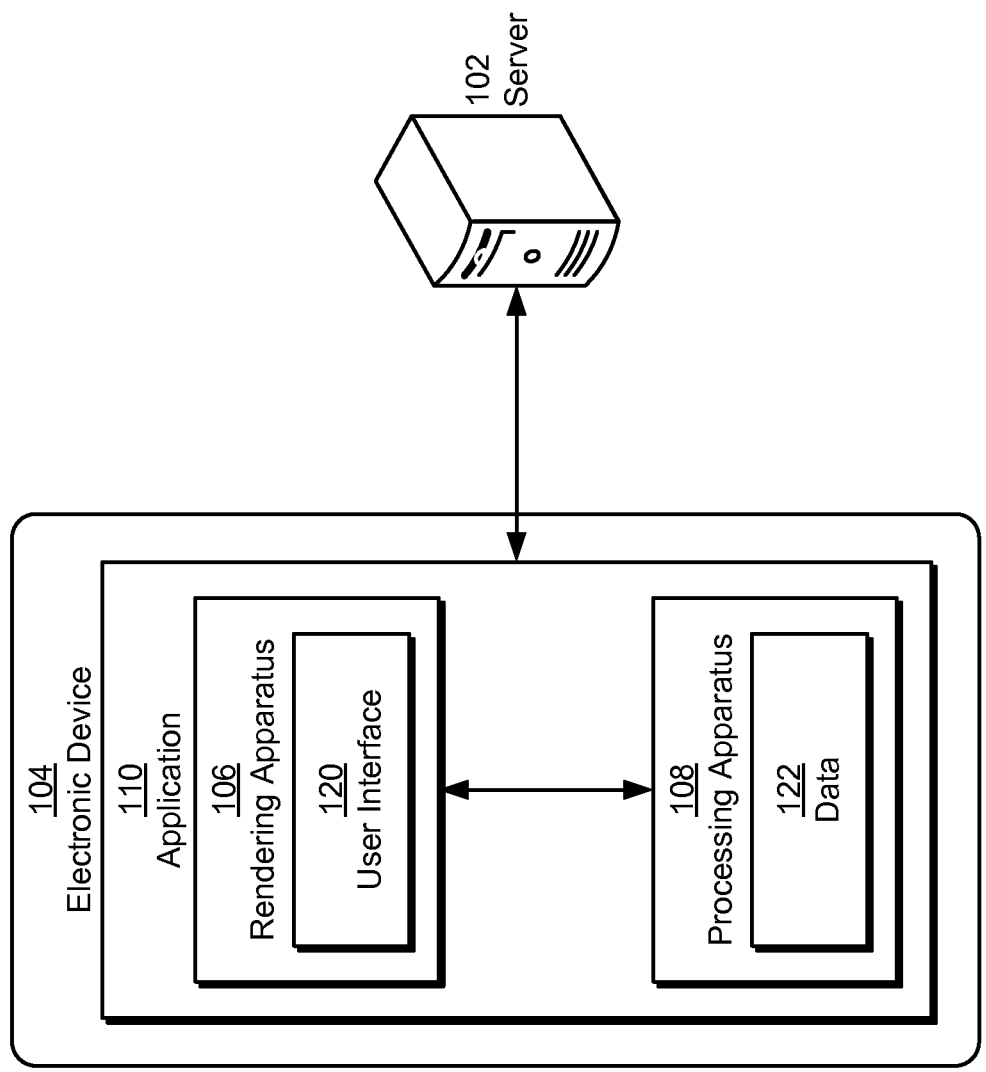
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

As variations in the form factors, platforms, and technologies of electronic devices continue to increase, applications may be required to adapt to the variations. For example, different versions of an application may be released to support execution on different processors, input/output (I/O) devices, operating systems, operating systems, screen sizes, and/or web browsers.

When an application is updated to support new features, functionality, platforms, form factors, or technologies, portions of the application's user interface may be provided by platform-specific rendering components. For example, the application may include a web view rendering component that embeds web pages within screens of the user interface, as well as one or more native rendering components that use various technologies (e.g., programming languages, libraries, hardware components, etc.) to natively render user-interface components in the user interface.

To reduce overhead associated with updating the user interface of the application, content used to render the interface may be decoupled from the platform-specific rendering components used to perform the rendering. For example, a view in the user interface may be described using structured data such as a JavaScript Object Notation (JSON) object. In turn, the structured data may be used by rendering components implemented on different platforms to render the same view.

Views in the user interface may further be rendered using metadata definitions that specify bindings of platform-agnostic view components to platform-specific user-interface elements in the rendering components. For example, the metadata definitions may include mappings of the view components to attribute-specific types that are based on form factor, as well as bindings of the attribute-specific types to the platform-specific user-interface elements. To render a view in the user interface, a rendering component in an electronic device may first identify one or more view components in the view from content describing the view. Next, the rendering component may use a first metadata definition to map the view component(s) to attribute-specific types for the form factor of the electronic device and a second metadata definition to bind the attribute-specific types to classes that implement one or more platform-specific user-interface elements in a native rendering component. The rendering component may then render the view components by instantiating the platform-specific user-interface element(s). Consequently, rendering of the views in the application may be customized and/or modified by platform, form factor, and/or other attributes without modifying source code for the rendering components.

The disclosed embodiments provide a method and system for facilitating use of an application on an electronic device. As shown in FIG. 1, an application 110 may reside on an electronic device 104 such as a mobile phone, personal computer, laptop computer, tablet computer, personal digital assistant, navigation system, digital camera, smart watch, and/or portable media player. For example, application 110 may be downloaded from an online application distribution platform, website, and/or server (e.g., server 102) and installed locally on electronic device 104. Alternatively, application 110 may be a web application that is loaded in a web browser of electronic device 104.

Application 110 may perform a set of tasks for a user of electronic device 104. For example, application 110 may allow the user to browse websites, send and receive emails, access and/or organize digital media, create and edit documents, play a game, use mapping and/or navigation services, file taxes, and/or manage personal finances.

During use of application 110, electronic device 104 may use a network connection to obtain data 122 and/or content associated with application 110 from a server 102 and transmit data from application 110 to server 102. For example, electronic device 104 may use a wired, wireless and/or cellular network to send and receive emails, financial information, digital media, game play information, and/or other data 122 or content used by application 110 with server 102. As a result, application 110 may execute using a client-server model.

In addition, interaction between the user and application 110 may be enabled by a user interface 120. For example, user interface 120 may be a graphical user interface (GUI) that displays text, images, documents, menus, icons, thumbnails, form fields, data, buttons, and/or other user-interface elements to the user. The GUI may also accept user input (e.g., gestures, keyboard presses, etc.) that is used to manipulate and/or update the elements. In other words, user interface 120 may be a mechanism for displaying or formatting data 122 or content associated with application 110 for use on electronic device 104.

In one or more embodiments, a rendering apparatus 106 in application 110 generates user interface 120 using content obtained from server 102. For example, rendering apparatus 106 may obtain the content as one or more Extensible Markup Language (XML) documents, JavaScript Object Notation (JSON) objects, and/or other types of structured, platform-agnostic data. The content may describe a set of views, a navigation flow associated with the views, a set of data elements, and/or a data model for the data elements. The described views may specify the text, images, and/or user-interface elements to be included in screens of user interface 120. The described navigation flow may specify the order in which screens of user interface 120 are to be displayed, such as a linear or non-linear flow through screens of user interface 120 that is based on a state of the application and/or data entered into the application by the user. The described data elements may include the names of the data elements, as well as any values of the data elements entered by the user and/or obtained from an external source (e.g., tax forms, public records, emails, etc.). The described data model may specify the data types of the data elements, such as text, Boolean, enumerated, numeric, date, currency, and/or other data types that may be specific to the application.

Rendering apparatus 106 may then use natively executing user-interface components to render one or more views or screens of user interface 120 specified in the structured data. In addition, rendering of user interface 120 may vary with the platform and/or type of electronic device 104. For example, rendering apparatus 106 may tailor the layout of the views in user interface 120 to the dimensions, orientation (e.g., portrait, landscape, etc.), form factor, and/or input/output (I/O) devices of electronic device 104.

Such decoupling of user-interface content from the platform in which the content is rendered may allow updates to user interface 120 to be deployed without changing the source code used to execute the application. For example, a designer or developer may upload a new version of the content to server 102. Once the new version of content is available in server 102, server 102 may provide the new version to rendering apparatus 106, and rendering apparatus 106 may generate one or more views in user interface 120 from the new version instead of previous versions of the content. Platform-independent rendering of content in applications (e.g., application 110) is described further in a co-pending non-provisional application by inventors Jay JieBing Yu, Matthew Sivertson, Vinay Kumar, Bojan Beran, Alex Balazs and Luise Felipe Cabrera, entitled "Common Declaration Representation of Application Content and User Interaction Content Processed by a User Experience Player," having Ser. No. 14/463,415 and filing date 19 Aug. 2014, which is incorporated herein by reference.

Data 122 collected through user interface 120 may then be used by a processing apparatus 108 in application 110 to perform one or more tasks for the user. For example, processing apparatus 108 may validate data 122, format data 122, use data 122 entered by the user to update a state of application 110, use data 122 to generate additional data or files, and/or commit data 122 to storage on electronic device 104 and/or server 102.

In one or more embodiments, rendering apparatus 106 is provided by multiple rendering components that are implemented using different technologies. For example, application 110 may be a tax-preparation application that executes on a mobile device such as a mobile phone, tablet computer, and/or portable media player. New versions of application 110 may be released yearly to accommodate new features, modes of operation, and/or changes in tax code or technology. As portions of application 110 are added or updated, different rendering components may be included in application 110 to support the rendering of user-interface views or components in those portions. As a result, user interface 120 may be provided by rendering components associated with early versions of application 110, widgets added to provide new features to application 110, third-party widgets by third-party developers, rendering components to support platform-specific execution of application 110, and/or web view rendering components that render embedded web pages within user interface 120.

Rendering apparatus 106 may also include an orchestrator that coordinates the rendering of views in user interface 120 by a set of rendering components. The orchestrator may use content from server 102 and/or other metadata to select a rendering component to be used in rendering a view represented by the content. The rendering component may use the content to render the second view, and the orchestrator and/or another component of rendering apparatus 106 may display the view in user interface 120. Orchestration of rendering components in user interfaces is described in a co-pending non-provisional application by inventors Ann Catherine Jose, Eugene Krivopaltsev and Jay JieBing Yu, entitled "Content-Driven Orchestration of Multiple Rendering Components in User Interfaces of Electronic Devices," having serial number TO BE ASSIGNED, and filing date TO BE ASSIGNED, which is incorporated herein by reference.

Figure 2:
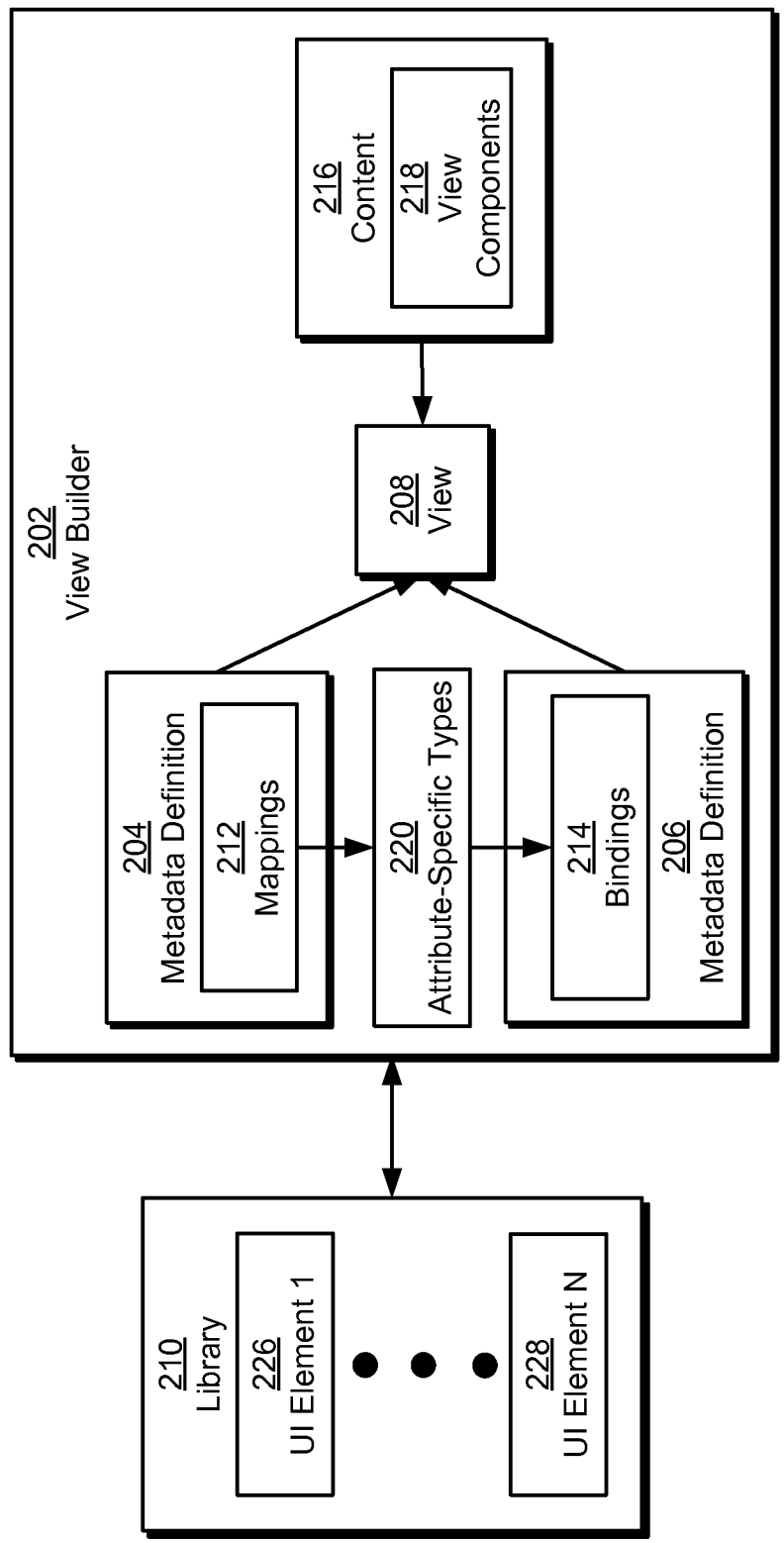
FIG. 2 shows a system for facilitating use of an application on an electronic device in accordance with the disclosed embodiments.

To further decouple configuration of user interface 120 from the operation of the rendering components, application 110 may use metadata to customize rendering of views in user interface 120 by platform, form factor, orientation, and/or other attributes associated with electronic device 104 without requiring changes to the implementation of the rendering components. As shown in FIG. 2, a view builder 202 may use a number of metadata definitions 204-206 to render a view 208 from platform-agnostic content 216 describing view 208. View builder 202 may execute within a rendering apparatus of an application on an electronic device, such as rendering apparatus 106 of FIG. 1. For example, view builder 202 may be a part of a platform-specific rendering component that renders a portion of a user interface (e.g., user interface 120 of FIG. 1) for the application from a JSON representation of the portion in content 216.

Metadata definition 204 may include a set of mappings 212, and metadata definition 206 may include a set of bindings 214. Mappings 212 may associate view components (e.g., view components 218) in the user interface with a set of attribute-specific types 220 associated with one or more attributes of the electronic device, and bindings 214 may associate attribute-specific types 220 with a set of platform-specific user-interface elements (e.g., user-interface (UI) element 1 226, UI element n 228) in a library 210.

View components 218 may be platform-agnostic descriptions of visual elements in view 208. For example, content 216 may include a list of view components 218 in view 208. Each view component may be defined by an identifier, a type (e.g., text, collection, field, form field, summary, choice, etc.), a value, a label, and/or other parameters related to the appearance or use of the view component. View components 218 may also be arranged in a render hierarchy, so that some view components are enclosed by other view components in the render hierarchy. A view component that is higher in the rendering hierarchy, such as an asset, may encapsulate components that are lower in the rendering hierarchy, such as a value or label of the asset.

Attribute-specific types 220 may be abstract "intermediate" representations of the view components that are associated with different values of the attribute(s). For example, different attribute-specific types 220 may be used with different form factors (e.g., phone, tablet, television, smart watch, etc.), orientations (e.g., portrait, landscape, etc.), dimensions, and/or other attributes associated with the environment of the electronic device. One or more sets of attribute-specific types 220 may also be associated with a default "universal" value for an attribute if views are not to be customized by that attribute and/or the electronic device lacks a value for the attribute.

Mappings 212 may be used to apply a first level of customization to view components 218 in content 216 based on the attribute(s). For example, mappings 212 may associate a platform-agnostic view component from content 216 with one of two attribute-specific types 220 that vary according to the form factor of the device to allow the view component to be rendered differently on each form factor. Alternatively, the view component may be mapped to the same attribute-specific type for both form factors if the view component is to be rendered the same way on both form factors.

Bindings 214 may be used to identify platform-specific user-interface elements for use in rendering view components 218 after mappings 212 are used to map view components 218 to attribute-specific types 220. For example, bindings 214 may map attribute-specific types 220 from mappings 212 to names of classes in library 210 that represent natively implemented platform-specific user-interface elements on the electronic device. Bindings 214 may also be modified to map a subset of attribute-specific types 220 to names of classes outside library 210 if the classes are used by the application and/or another entity to override the operation of platform-specific user-interface elements in library 210.

To generate view 208 from content 216 and metadata definitions 204-206, view builder 202 may use metadata definition 204 and one or more attributes (e.g., form factor, orientation, etc.) of the electronic device to obtain an attribute-specific type for each view component in content 216. Next, view builder 202 may identify a rule from the second metadata definition for binding the attribute-specific type to a platform-specific user-interface element and obtain the platform-specific user-interface element for rendering the view component from the rule. Finally, view builder 202 may cause the view component to be rendered by instantiating the platform-specific user-interface element through a call to library 210.

For example, content 216 may describe a view component that is identified by a type of "barchart." View builder 202 may use the "barchart" type and a "phone" form factor of the electronic device to obtain the following JSON representation of a mapping from metadata definition 204:

```
"phone":{
   "render_type":"simple_scrollable_view",
   "components":[
     {
       "json":[
         "type":"barchart"
       },
       "render_type":"barchart_phone"
       . . .
```

Within the JSON representation, the "barchart" type may be associated with an attribute-specific type (e.g., "render_type") of "barchart_phone." In other words, metadata definition 204 may specify an attribute-specific type of "barchart_phone" for a "barchart" view component on an electronic device with a "phone" form factor.

Next, view builder 202 may match the "barchart_phone" attribute-specific type to the following JSON representation of a platform-specific binding from metadata definition 206:

```
{
    "render_type": "barchart_phone",
    "class": "QBPlayerBarAsset"
}
```

The JSON representation may associate the attribute-specific type of "barchart_phone" to a "class" of "QBPlayerBarAsset." Thus, metadata definition 206 may identify a platform-specific user-interface component of "QBPlayerBarAs set" for rendering of the "barchart_phone" attribute-specific type.

Metadata definition 204 and/or metadata definition 206 may optionally contain additional information to assist view builder 202 with rendering view 208. First, mappings 212 may include modifiers for attribute-specific types 220 that further customize the rendering of view components 218 by view builder 202. For example, metadata definition 204 may include the following JSON representation:

```
{
    "json":{
        "type": "multiSelect"
    },
    "render_type":"tabular_multi_choice_phone"
},
{
    "json":{
        "type": "multiSelect",
        "role":"monthselector"
    },
    "render_type":"toggle_months_choice_phone"
},
...
```

The JSON representation may include two mappings 212 for a view component with a type of "multiSelect." The first mapping may specify an attribute-specific type of "tabular_multi_choice_phone" for the view component, and the second mapping may specify an attribute-specific type of "toggle_months_choice_phone" for the view component. The second mapping may additionally include a "role" of "monthselector" for the "multiSelect" view component. The "role" may act as a modifier that causes the second mapping to be applied to an instance of the "multiSelect" view component in content 216 when content 216 also specifies a "role" of "monthselector" for the instance. On the other hand, the first mapping may be applicable to the instance if content 216 does not specify a "role" for the instance. The first mapping may also be used as a generic fallback rule for when the second mapping and metadata definition 206 do not resolve into a user-interface element 210 that is available on the platform of the electronic device.

Second, bindings 214 may include configuration options that are used to modify the appearance and/or behavior of the corresponding platform-specific user-interface elements. For example, metadata definition 206 may include the following JSON representation:

```
{
    "render_type":"toggle_months_choice_phone",
    "class":"SCPlayerMultiChoiceCalendar",
    "config":{
        "image_selected":"calendar-check_iphone",
        "image_unselected":"calendar-square_iphone",
        "select_all_action_present":true,
        "minimum_choices_for_select_all_or_none":0,
        "action_row_height":40,
        "numberOfColumns":4
    }
}
```

In the JSON representation, a rule is used to bind an attribute-specific type of "toggle_months_choice_phone" to a platform-specific user-interface element named "SCPlayerMultiChoiceCalendar." The rule also includes a "config" element with a list of configuration options for the platform-specific user-interface element. The configuration options may include display options such as "image_selected," "image_unselected," "select_all_action_present," and "minimum_choices_for_select_all_or_none." The configuration options may also include a layout option for "numberOfColumns." Finally, the configuration options may include a size option for "action_row_height."

To render a "multiSelect" view component using the exemplary JSON representations described above, view builder 202 may obtain a description of the view component from content 216 and determine that the description identifies a "role" of "monthselector" for the view component. Next, view builder 202 may use mappings 212 and a form factor of "phone" for the electronic device to obtain an attribute-specific type of "toggle_months_choice_phone" for the view component. View builder 202 may then use bindings 214 for the platform of the electronic device to obtain a platform-specific user-interface element named "SCPlayerMultiChoiceCalendar" for the attribute-specific type of "toggle_months_choice_phone." Finally, view builder 202 may obtain configuration options for "image_selected," "image_unselected," "select_all_action_present," "minimum_choices_for_select_all_or_none," "action_row_height," and "numberOfColumns" from bindings 214 and instantiate the platform-specific user-interface element with the configuration options. In turn, the appearance and/or behavior of the platform-specific user-interface element may be configured according to the configuration options.

Figure 3:
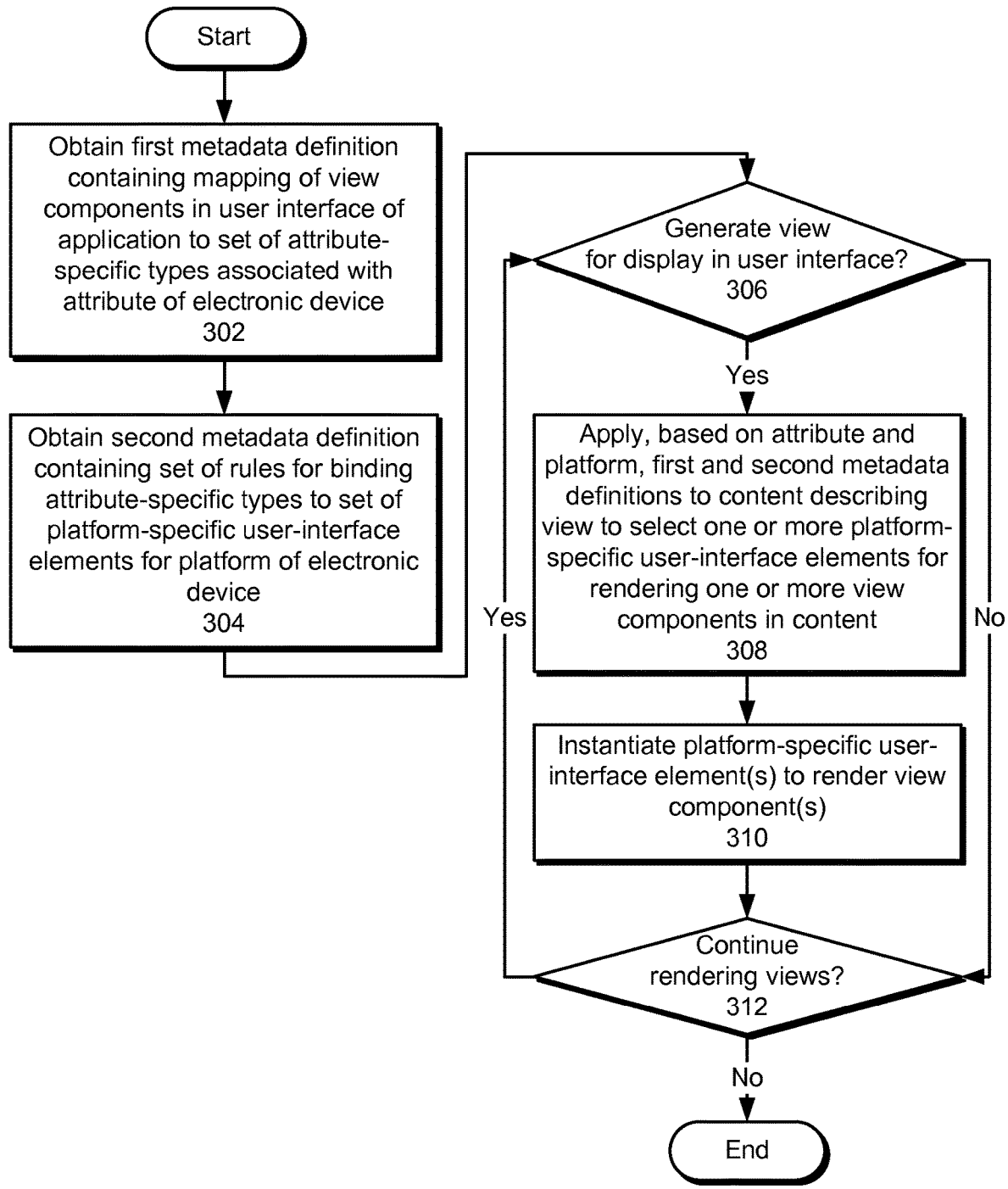
FIG. 3 shows a flowchart illustrating the process of facilitating use of an application on an electronic device in accordance with the disclosed embodiments.

FIG. 3 shows a flowchart illustrating the process of facilitating use of an application on an electronic device in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, a first metadata definition containing a mapping of view components in a user interface of the application to a set of attribute-specific types associated with an attribute of the electronic device is obtained (operation 302). For example, the first metadata definition may map the view components to the attribute-specific types based on a form factor and/or orientation of the electronic device. A second metadata definition containing a set of rules for binding the attribute-specific types to a set of platform-specific user-interface elements for the platform of the electronic device is also obtained (operation 304). The first and second metadata definitions may be created or modified by a developer of the application and/or the developer of a rendering component for the application.

The first and second metadata definitions may be used to generate a view for display in the user interface (operation 306). For example, the metadata definitions may be used by a view builder in the application to render views in the user interface during execution of the application. If no view is to be generated, the first and second metadata definitions may remain unused by the application.

If a view is to be generated for display in the user interface, the first and second metadata definitions are applied to content describing the view to select one or more platform-specific user-interface elements for rendering one or more view components in the content (operation 308).

The platform-specific user-interface element(s) may then be instantiated to render the view component(s) (operation 310). Generating views for display in user interfaces of applications is described in further detail below with respect to FIG. 4.

Views may continue to be rendered (operation 312) in the user interface using the first and second metadata definitions. For example, views may be rendered during execution of the application to allow a user to interact with the application. If views are to be rendered, a view may be generated for display in the user interface (operation 306) by using the metadata definitions to select one or more platform-specific user-interface elements for rendering one or more view components in the view (operation 308), and then instantiating the platform-specific user-interface element(s) (operation 310). Views may thus continue to be rendered until use of the application is discontinued.

Figure 4:
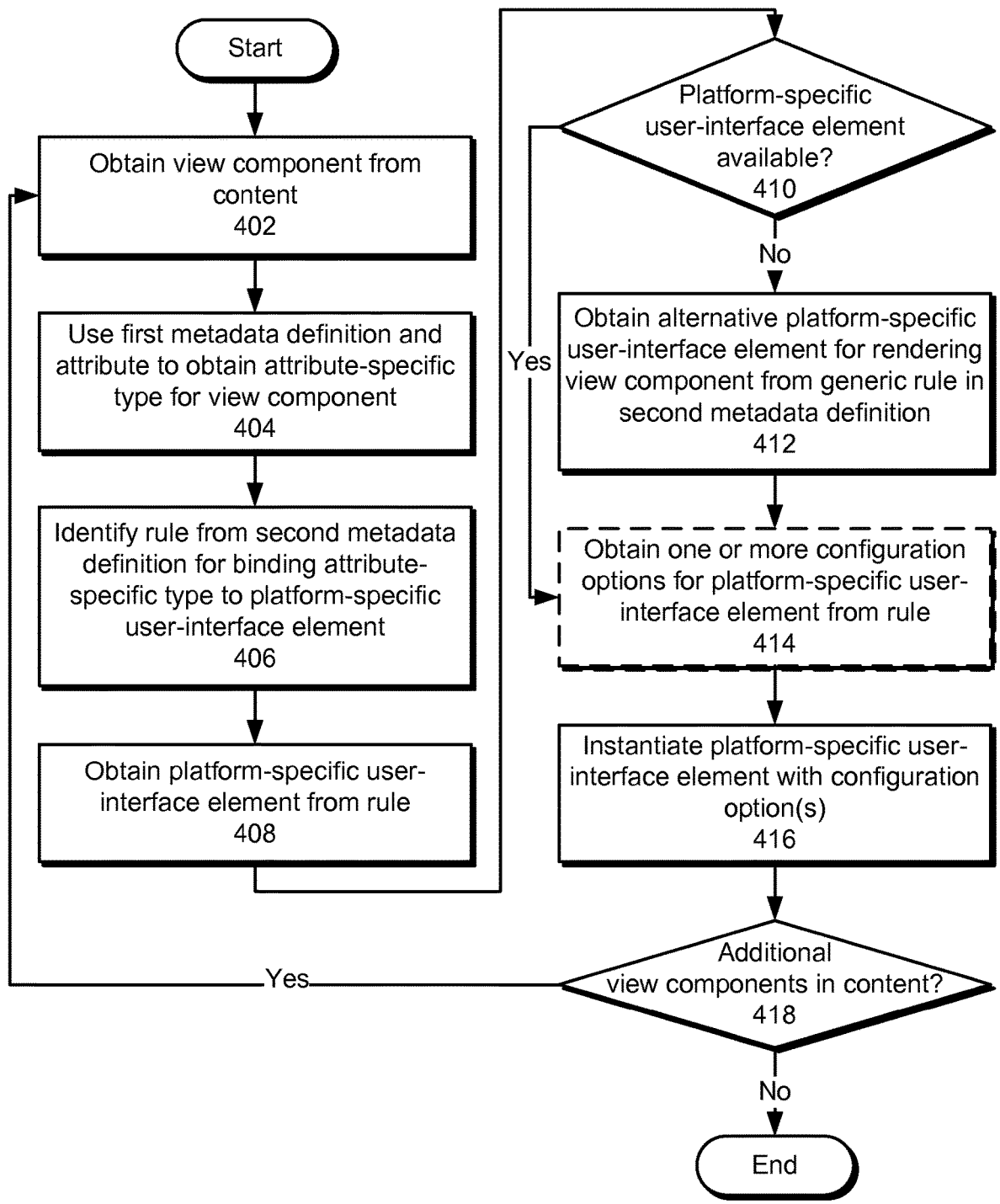
FIG. 4 shows a flowchart illustrating the process of generating a view for display in a user interface of an application on an electronic device in accordance with the disclosed embodiments.

FIG. 4 shows a flowchart illustrating the process of generating a view for display in a user interface of an application on an electronic device in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a view component is obtained from content (operation 402) describing the view. For example, the view component may be identified from a JSON representation of the view. Next, a first metadata definition and an attribute of the electronic device are used to obtain an attribute-specific type for the view component (operation 404). For example, an identifier for the view component and the attribute may be used to identify a mapping of the view component to the attribute-specific type from the first metadata definition.

A rule from a second metadata definition for binding the attribute-specific type to a platform-specific user interface is then identified (operation 406), and the platform-specific user-interface element is obtained from the rule (operation 408). For example, the attribute-specific type and a platform of the electronic device may be matched to a rule in the second metadata definition, and an identifier for the platform-specific user-interface element may be obtained from the rule.

The platform-specific user-interface element may or may not be available (operation 410) on the electronic device. For example, the platform-specific user-interface element may be unavailable if a class implementing the platform-specific user-interface element cannot be found in a library on the electronic device. If the platform-specific user-interface element is available on the electronic device, one or more configuration options for the platform-specific user-interface element are optionally obtained from the rule (operation 414). The configuration options may include a display option (e.g., checking or unchecking of boxes, display of images with the platform-specific user-interface element, color, bordering, font, etc.), a layout option (e.g., alignment, number of columns, shifting, orientation, spacing, etc.), and/or a size option (e.g., height, width, depth, dimension, thickness, font size, etc.). The platform-specific user-interface element is then instantiated with the configuration option(s) (operation 416). For example, a class representing the platform-specific user-interface element may be initialized, and the configuration options may be passed to a constructor and/or one or more methods of the class.

If the platform-specific user-interface element cannot be found on the electronic device, an alternative platform-specific user-interface element for rendering the view component is obtained from a generic rule in the second metadata definition (operation 412). For example, the alternative platform-specific user-interface element may be obtained from a generic rule that lacks a modifier for the attribute-specific type, such as a role associated with the attribute-specific type. After the alternative platform-specific user-interface element is substituted for the original platform-specific user-interface element, the alternative platform-specific user-interface element is instantiated with one or more optional configuration options (operations 414-416).

The content may contain additional view components (operation 418) to be rendered. Each additional component may be obtained from the content (operation 402) and resolved to a platform-specific user-interface element using the first and second metadata definitions (operations 404-408). If the platform-specific user-interface element is not available, an alternative platform-specific user-interface element is selected instead (operations 410-412). The selected platform-specific user-interface element is then instantiated (operations 414-416) to render the view component in the view. Selection and instantiation of platform-specific user-interface elements for rendering view components may continue until all view components in the view have been rendered.

Figure 5:
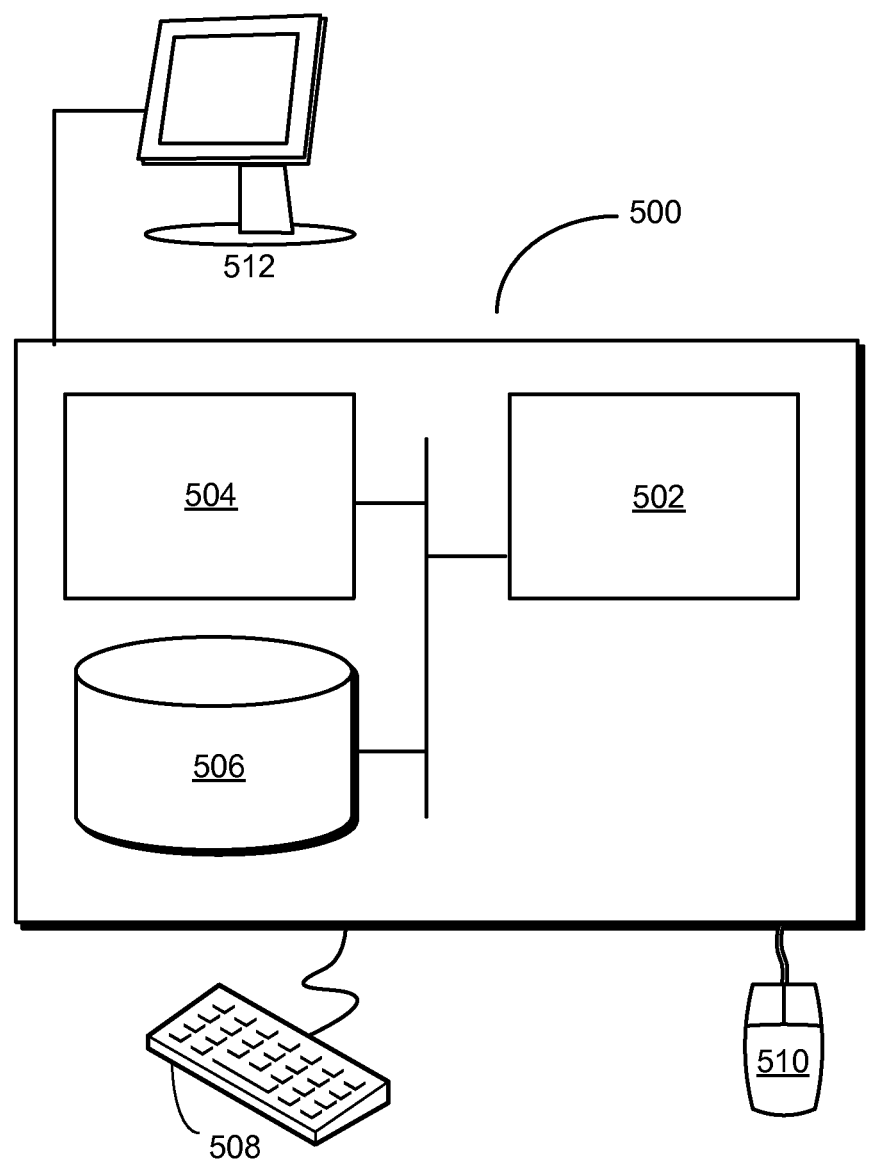
FIG. 5 shows a computer system in accordance with the disclosed embodiments.

FIG. 5 shows a computer system 500 in accordance with an embodiment. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating use of an application on an electronic device. The system may include a view builder that obtains a first metadata definition containing a mapping of view components in a user interface of the application to a set of attribute-specific types associated with an attribute of the electronic device. The view builder may also obtain a second metadata definition containing a set of rules for binding the set of attribute-specific types to a set of platform-specific user-interface elements for a platform of the electronic device. The view builder may then generate a view for display in the user interface by applying, based on the attribute and the platform, the first and second metadata definitions to content describing the view to select one or more platform-specific user-interface elements for rendering one or more of the view components in the content, and instantiating the platform-specific user-interface element(s) to render the view component(s).

In addition, one or more components of computer system 500 may be remotely located and connected to the other components over a network. Portions of the present embodiments (e.g., rendering apparatus, processing apparatus, orchestrator, rendering components, server, etc.) may also be located on different nodes of a distributed system that implements the embodiments. For example, the present embodiments may be implemented using a cloud computing system that manages the rendering of platform-independent content by a set of platform-specific rendering components on a set of remote electronic devices.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for rendering a view in a user interface of an application on an electronic device, comprising:
   for each electronic device of a set of electronic devices:
      obtaining, at the electronic device from a remote server, platform agnostic data describing a user interface of an application as structured data to be implemented on different platforms to render the same view on each platform of each electronic device, wherein the platform agnostic data includes:
         a set of views in the user interface, and
         a navigation flow associated with the set of views;
      generating the user interface of the application on the electronic device based on the platform agnostic data; and
      rendering each view according to the navigation flow in the user interface, based on an attribute associated with the electronic device and a plurality of metadata definitions associated with the electronic device, by:
         identifying each view component in a view from the platform agnostic data, wherein each view component is arranged in a render hierarchy;
         mapping, via a first type of metadata definition from the plurality of metadata definitions, each view component to an attribute-specific type of view component based on a form factor of the electronic device;
         binding, via a second type of metadata definition from the plurality of metadata definitions, the attribute-specific type to a class in a library that represents natively implemented platform-specific user-interface elements on the electronic device, wherein the binding comprises at least:
            identifying a first rule from the second type of metadata definition to bind the attribute-specific type of view component to a platform-specific user interface element;
            failing to identify any available platform-specific user-interface element on the electronic device based on the first rule; and
            obtaining an alternative platform-specific user-interface element for rendering the view component from a generic rule in the second type of metadata definition;
         obtaining one or more configuration options specific to the electronic device from the second type of metadata definition; and
         instantiating the alternative platform-specific user-interface element with the one or more configuration options by a call to the library to render the view.

2. The method of claim 1, wherein the one or more configuration options comprise at least:
   a display option;
   a layout option; or
   a size option.

3. The method of claim 1, wherein the attribute includes an orientation associated with the electronic device.

4. An apparatus, comprising:
   one or more processors; and
   a memory storing instructions that, when executed by the one or more processors, performs an operation for rendering a view in a user interface of an application on an electronic device, the operation comprising:
      obtaining, from a remote server, platform agnostic data describing the user interface of the application on the electronic device, wherein the platform agnostic data includes:
         a set of views in the user interface, and
         a navigation flow associated with the set of views;
      generating the user interface of the application on the electronic device based on the platform agnostic data; and
      rendering each view according to the navigation flow in the user interface, based on an attribute associated with the electronic device and a plurality of metadata definitions associated with the electronic device, by:
         identifying each view component in the view from the platform agnostic data, wherein each view component is arranged in a render hierarchy;
         mapping, via a first type of metadata definition from the plurality of metadata definitions, each view component to an attribute-specific type of view component based on a form factor of the electronic device;
         binding, via a second type of metadata definition from the plurality of metadata definitions, the attribute-specific type to a class in a library that represents natively implemented platform-specific user-interface elements on the electronic device, wherein the binding comprises at least:

identifying a first from the second type of metadata definition to bind the attribute-specific type of view component to a platform-specific user interface element;

failing to identify any available platform-specific user-interface element on the electronic device based on the first rule; and obtaining an alternative platform-specific user-interface element for rendering the view component from a generic rule in the second type of metadata definition;

obtaining one or more configuration options specific to the electronic device from the second type of metadata definition; and instantiating the alternative platform-specific user-interface element with the one or more configuration options by a call to the library to render the view.

5. A non-transitory computer-readable storage medium storing instructions that when executed by an electronic device cause the electronic device to perform a method for rendering a view in a user interface of an application on the electronic device, the method comprising:

obtaining, from a remote server, platform agnostic data describing a user interface of an application on an electronic device, wherein the platform agnostic data includes:
a set of views in the user interface, and
a navigation flow associated with the set of views;

generating the user interface of the application on the electronic device based on the platform agnostic data; and rendering each view according to the navigation flow in the user interface, based on an attribute associated with the electronic device and a plurality of metadata definitions associated with the electronic device, by:

identifying each view component in a view from the platform agnostic data, wherein each view component is arranged in a render hierarchy;

mapping, via a first type of metadata definition from the plurality of metadata definitions, each view component to an attribute-specific type of view component based on a form factor of the electronic device;

binding, via a second type of metadata definition from the plurality of metadata definitions, the attribute-specific type to a class in a library that represents natively implemented platform-specific user-interface elements on the electronic device, wherein the binding comprises at least:

identifying a first rule from the second type of metadata definition to bind the attribute-specific type of view component to a platform-specific user interface element;

failing to identify any available platform-specific interface element on the electronic device based on the first rule; and obtaining an alternative platform-specific user-interface element for rendering the view component form a generic rule in the second type of metadata definition;

obtaining one or more configuration options specific to the electronic device from the second type of metadata definition; and instantiating the alternative platform-specific user-interface element with the one or more configuration options by a call to the library to render the view.

6. The non-transitory computer-readable storage medium of claim 5, wherein the attribute includes an orientation associated with the electronic device.

7. The apparatus of claim 4, wherein the one or more configuration options comprise at least one of:
a display option;
a layout option; or
a size option.

8. The apparatus of claim 4, wherein the attribute includes an orientation associated with the electronic device.

9. The non-transitory computer-readable storage medium of claim 5, wherein the one or more configuration options comprise at least one of:
a display option;
a layout option; or
a size option.

10. The method of claim 1, wherein the platform agnostic data describing the view further describes a data model for a set of data elements.

11. The method of claim 1, comprising: rendering the view during execution of the application on the electronic device until use of the application is discontinued.

12. The method of claim 1, wherein the first type of metadata definition further comprises a modifier for the attribute-specific type.

13. The apparatus of claim 4, wherein the platform agnostic data describing the view further describes a data model for a set of data elements.

14. The apparatus of claim 4, wherein the operation further comprises: rendering the view during execution of the application on the electronic device until use of the application is discontinued.

15. The apparatus of claim 4, wherein the first type of metadata definition further comprises a modifier for the attribute-specific type.

16. The non-transitory computer-readable storage medium of claim 5, wherein the platform agnostic data describing the view further describes a data model for a set of data elements.

17. The non-transitory computer-readable storage medium of claim 5, wherein the method further comprises: rendering the view during execution of the application on the electronic device until use of the application is discontinued.

* * * * *